May 19, 1959   E. F. KUBLER   2,887,648
PHASE SHIFTING NETWORK
Filed July 25, 1956   2 Sheets-Sheet 1

Inventor:
Ernest F. Kubler,
by Irving H. Marshman.
His Attorney.

May 19, 1959  E. F. KUBLER  2,887,648
PHASE SHIFTING NETWORK
Filed July 25, 1956  2 Sheets-Sheet 2
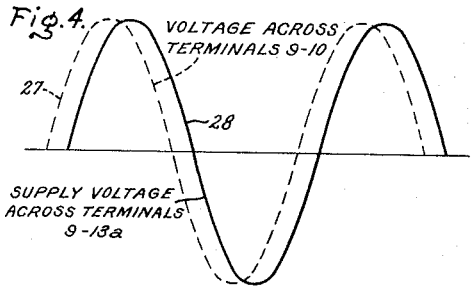
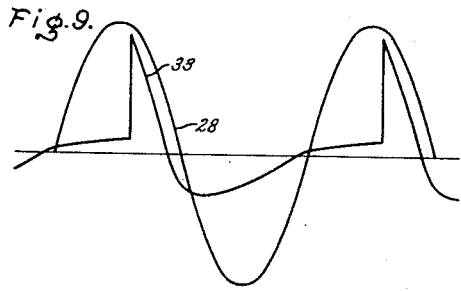
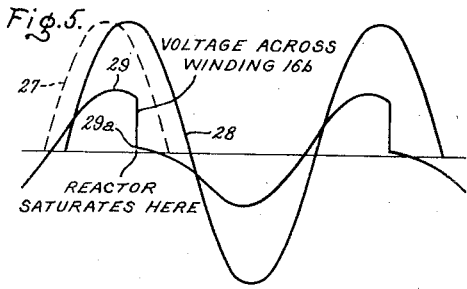
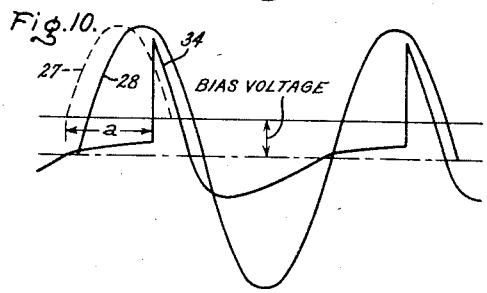
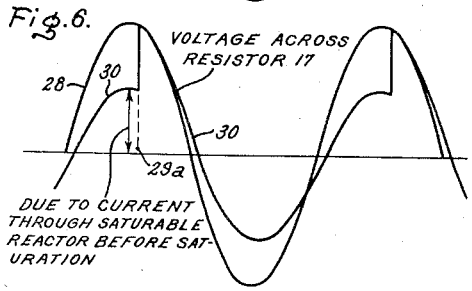
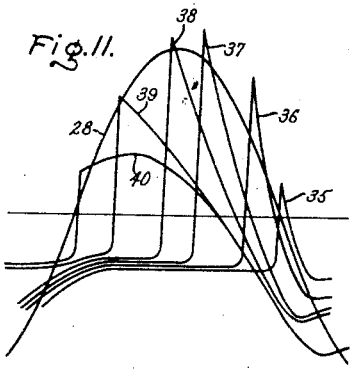
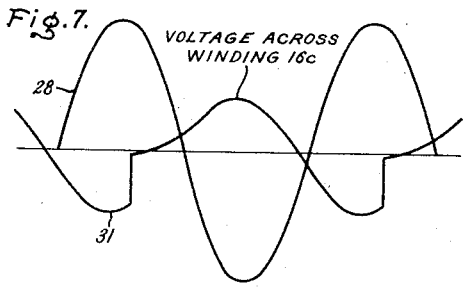
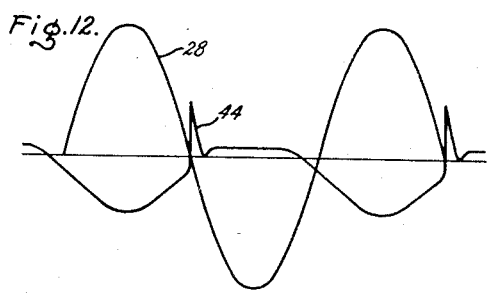
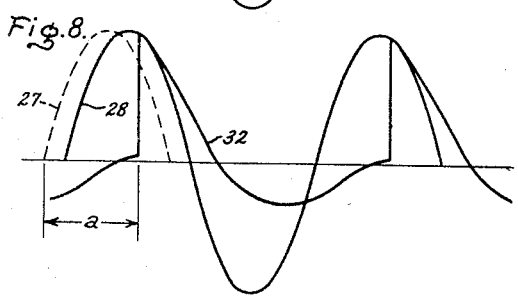
Inventor:
Ernest F. Kubler,
by Irving H. Marshman,
His Attorney.

United States Patent Office 2,887,648
Patented May 19, 1959

2,887,648

PHASE SHIFTING NETWORK

Ernest F. Kubler, Waynesboro, Va., assignor to General Electric Company, a corporation of New York Application July 25, 1956, Serial No. 600,122

8 Claims. (Cl. 323—125)

This invention relates to apparatus for deriving a voltage from a source of alternating voltage and for shifting the phase of the derived voltage with respect to the voltage of the source, and an object of the invention is the provision of a simple, reliable and efficient control device of this character.

Another object of this invention is the provision of a phase-shifting network which will produce a voltage of a very steep, i.e. substantially vertical wave front throughout a range of 180 degrees with respect to the voltage of the source and which is positive for approximately 90 degrees and negative for approximately 270 degrees of each cycle.

A further object of the invention is the provision of a phase-shifting network which contains fewer parts and is considerably less expensive than presently known phase-shifting devices.

In carrying the invention into effect in one form thereof, a periodically varying voltage having a substantially vertical wave front is derived from a pair of alternating voltage supply terminals by means of a control circuit in which is included an impedance device and a main load circuit winding of a saturable reactor. Means are provided for varying the point in the alternating voltage cycle at which the reactor saturates. Connections are provided for deriving a periodically varying voltage from the control circuit, and included in these connections is a second load circuit reactance winding of the saturable reactor which is poled to counteract that portion of the voltage produced in such connections by the load circuit current of the reactor prior to the point of saturation in each cycle of the alternating voltage.

The phase-shifting network is well adapted for use with electric valves such for example as thyratrons. In control systems in which valves of this character are used, the conduction of the valve is usually controlled by shifting the phase of the voltages supplied to the control electrodes with respect to the anode voltages. Accordingly, an additional aspect of this invention is a control system including an electric discharge device, such for example as a thyratron, and a phase-shifting network therefore.

Figure 1:
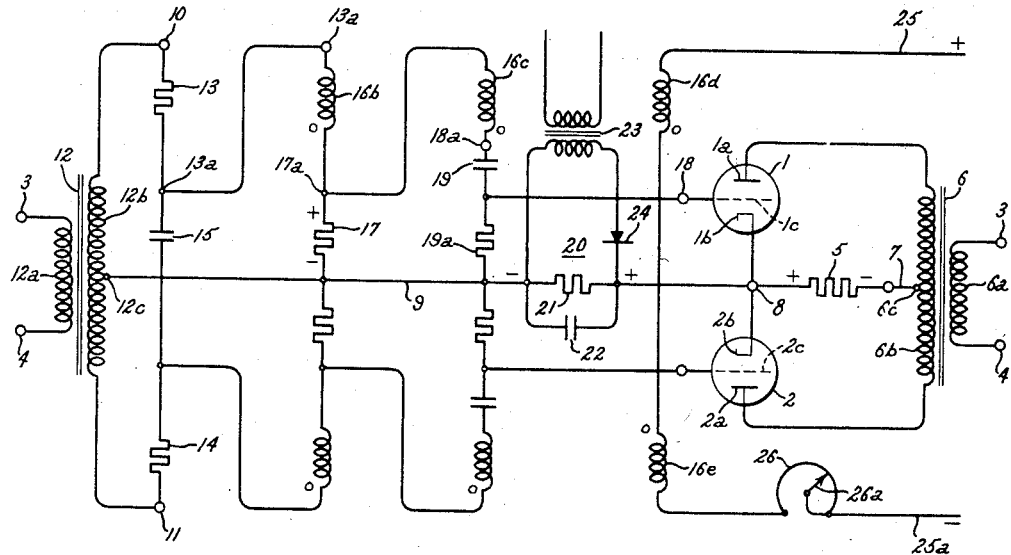
Figure 2:
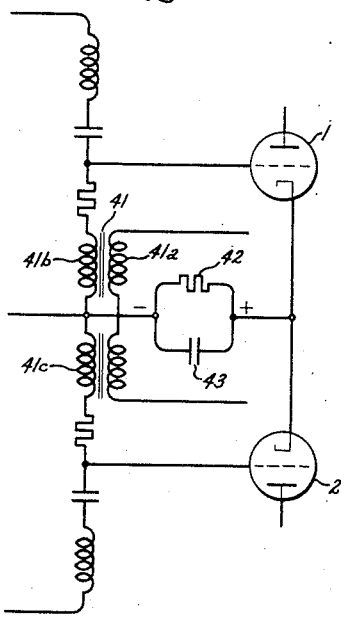
Figure 3:
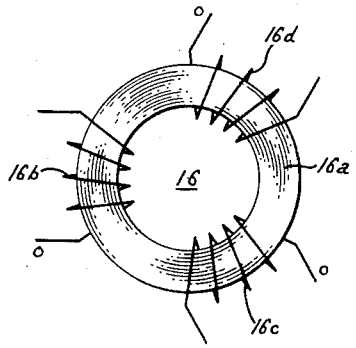

For a better and more complete understanding of the invention, reference should now be had to the following specification and to the accompanying drawings of which Fig. 1 is a simple diagrammatical sketch of an embodiment of the invention, Fig. 2 is a simple diagrammatical sketch of a modification, Fig. 3 is a sketch of a detail employed in both modifications and Figs. 4 to 12 inclusive are charts of characteristic curves which serve to facilitate an understanding of the invention.

Referring now to Fig. 1 of the drawing, there is illustrated a pair of thyratrons 1 and 2 arranged in a system for transmitting energy from a source of alternating voltage such as the supply terminals 3 and 4 to a direct current load circuit 5. These thyratrons are illustrated as being connected in a diametrical bi-phase rectifying circuit, i.e. the anodes 1a and 2a of the thyratrons are connected to opposite terminals of the secondary winding 6b of a transformer 6 of which the primary winding 6a is connected to alternating voltage supply terminals 3 and 4. The electrical mid-point 6c of the secondary winding is connected to the conductor 7 which thus becomes the negative supply conductor of the direct current circuit, and the cathodes 1b and 2b are connected to the common terminal 8 which becomes the positive supply terminal. Control of the current conducted by the thyratrons is effected by supplying to the control electrodes 1c and 2c a periodically varying voltage with the same periodicity as the anode voltage and shifting the phase of such voltage relative to the anode voltage.

For this purpose, a control electrode voltage phase-shifting network is provided. The entire network illustrated in Fig. 1 is really two networks, i.e. one for the thyratron 1 and the other for the thyratron 2. The network above the negative supply conductor 9 controls the control electrode voltage of thyratron 1. It is identical with the network illustrated beneath the conductor 9 which controls the control electrode voltage of thyratron 2. In the interest of simplicity, the following explanation is directed to the network which controls the firing of thyratron 1. The same theory and explanation apply to the network which controls thyratron 2 except that all voltages are delayed by 180 degrees.

A pair of alternating voltage supply terminals 10 and 11 which may be the secondary terminals of a transformer 12 are energized with alternating voltage from a suitable supply source such as the supply terminals 3 and 4 to which the primary winding 12a of the transformer is connected. These terminals 3 and 4 are the same terminals as those to which the thyratrons 1 and 2 are connected through the transformer 6. To the electrical mid-point 12c of secondary winding 12b is connected the negative supply conductor 9. The voltage between terminals 10 and 11 may have any suitable value which in this case is assumed to be 230 volts. Thus the voltage between terminal 9 and either outside terminal 10 or 11 is 115 volts. Across the supply terminals 10 and 11 is connected a resistor capacitor network which comprises resistors 13 and 14 and capacitor 15 all connected in series relationship and with the capacitor in the intermediate position between the two resistors. Between the common terminal 13a of resistor 13 and capacitor 15 and the negative supply terminal 9 is connected a control circuit in which are connected in series relationship with each other the load circuit reactance winding 16b of a single core saturable reactor 16 and an impedance device 17 which could be a resistive impedance, an inductive impedance or a combination of both. Preferably, it is a resistor.

For the purpose of deriving from the control circuit 16b, 17 and supplying to the output terminals 8 and 18 a periodically varying voltage, electrical connections are provided in which are included a second load circuit reactance winding 16c of the reactor 16. The winding 16c is poled so that its voltage opposes the voltage across the resistor 17. Although the saturable reactor 16 may have any suitable construction, it preferably comprises a single circular core member 16a upon which are wound the first main load circuit reactance winding 16b, the second load circuit reactance winding 16c and a direct current saturating winding 16d. In Figs. 1 and 3 the polarities of the reactor windings are indicated by small circles adjacent the terminals at which, at any instant, the voltages all have the same polarity, i.e. at which they are all positive or all negative. Preferably, the core member 16a is a spirally wound tape which is made of any suitable material having a rectangular hysteresis loop such for example as any of the nickel iron alloys marketed under the trademarks Deltamax, Permalloy and Mumetal, to name but a few.

Between the lower terminal 18a of reactor winding 16c and the supply terminal 9 is connected a resistance reactance network which is illustrated as comprising a capacitor 19 and a resistor 19a connected in series relationship with each other. The output terminals 18 and 8 are connected to the control electrode 1c and to the cathode 1b respectively of thyratron 1. For the purpose of biasing the thyratron 1 below cutoff, suitable means 20 are provided for supplying a negative bias voltage between the control electrode 1c and cathode 1b. These means are illustrated as a parallel combination of resistor 21 and capacitor 22 which is included in the cathode to control electrode connections. A direct voltage of which the polarity is negative toward the control electrode is supplied to the resistor capacitor combination by means of a transformer 23 and a rectifier 24 which is connected in circuit with the secondary winding of the transformer. The primary winding of the transformer 23 is supplied from any suitable source of alternating voltage which may be and preferably is the same source as the alternating voltage supply terminals 3 and 4.

The saturating winding 16d of the reactor is supplied with direct voltage from a suitable source such as represented by terminals 25 and 25a. It will be noted that the saturating winding 16d is connected in series relationship with the corresponding saturating winding 16e of the saturable reactor of the phase-shifting network which controls thyratron 2. A rheostat 26 is included in series relationship with these saturating windings and serves to vary their direct current excitation between minimum and maximum values. The small circles adjacent the reactor winding in Figs. 1, 2 and 3 denote the alternating voltage polarity of such windings, i.e. they indicate that the voltages of the designated terminals must be either all positive or all negative at the same instant.

With the foregoing understanding of the elements and their organization, the operation of the phase-shifting network of the invention will readily be understood from the following detailed description.

One-half of the alternating voltage of the secondary winding 12b appears at the terminals 9 and 10. In Fig. 4 this voltage is represented by the dotted sinusoidal curve 27. This voltage between terminals 9 and 10 is in phase with the line voltage of supply terminals 3 and 4 and therefore in phase with the voltage which is supplied to the anode 1a of thyratron 1. The resistor-capacitor network combination 13, 14 and 15 acts as a fixed phase-shift network to derive from the line voltage and produce at terminals 9 and 13a an alternating voltage which lags the line voltage by a suitable amount, e.g. 20 electrical degrees as illustrated in Fig. 4 by the sinusoidal curve 28. The voltage between terminals 9 and 13a is equal to one-half the voltage across the capacitor 15.

Across the main load circuit reactance winding 16b of the saturable reactor there appears a periodically varying voltage which is represented in Fig. 5 by the curve 29 of which ordinates represent the voltage at terminal 13a with respect to terminal 17a. At a point in the alternating voltage cycle which is designated 29a, the reactor saturates and the voltage across the winding 16b collapses substantially to zero as indicated by the steeply descending portion of the curve. The collapse of voltage across the winding is so nearly instantaneous that the descending portion of the curve 29 at the point of saturation is substantially vertical.

The difference between the supply voltage between terminals 13a and 9 as represented by curve 28 and the voltage across the reactance winding 16b appears across the resistor 17 and is represented in Fig. 6 by the curve 30 of which ordinates represent the voltage of terminal 17a with respect to voltage of the supply terminal 9. It will be noted that in the unsaturated region of the voltage across the reactor, the voltage across resistor 17 has values which are greater than zero. In other words, the supply voltage is not completely absorbed by the load circuit reactance winding 16b. The current which flows through the reactance winding 16b is due to the loading produced by windings 16c and 16d, rheostat 26 and capacitor resistor combination 19 and 19a. Owing to the collapse of voltage across reactance winding 16b at the saturation point 29a, substantially all of the supply voltage in the saturated region appears across resistor 17 and consequently the steepness of the collapse of the voltage across the reactance winding is matched by the steepness of the rise in voltage across the resistance 17. In other words at the point of collapse of the voltage across the reactance winding 16b the voltage across the resistance 17 has substantially a vertical wave front as represented by the vertically rising portion of curve 30 at point 29a. The voltage represented by the portion of the curve 30 prior to the saturation point 29a is not satisfactory for firing thyratrons because its rise is generally sinusoidal and therefore too gradual at the point of its intersection with the critical control electrode voltage of the thyratron. In order that the voltage supplied to the control electrode 1c shall be steeply peaked and shall have a vertical wave front, the effects produced by current flow in the load circuit of the saturable reactor prior to the point of saturation are counteracted by poling the reactance winding 16c in the connections to the control electrode so that its voltage opposes the voltage across resistor 17. The voltage across reactance winding 16c is represented in Fig. 7 by the curve 31. Owing to the reverse polarity of winding 16c, this voltage is equal but opposite to the voltage of winding 16b as represented by curve 29 in Fig. 5. In the control electrode connection, this voltage is added to the voltage across resistor 17. The sum of the voltages across the resistor 17 and reactance winding 16c is represented in Fig. 8 by the curve 32. This voltage appears between the terminals 9 and 18. Actually it represents the voltage of terminal 18 with respect to terminal 9. The voltage produced in the connections to the control electrode by the reactor load current prior to the point of saturation in the alternating voltage cycle is thus substantially eliminated.

It will be noted that the vertical portion of the voltage wave 32 in the early part of the alternating voltage cycle tends to swing below the zero line for small values of the firing angle a. This portion of the voltage wave is elevated above the zero line by action of the capacitor resistor network 19, 19a. This effect is illustrated in Fig. 9 in which the modified voltage wave is represented by the curve 33.

The negative bias voltage which is supplied in the cathode to control electrode connections by the negative bias voltage means 20 depresses the periodically varying voltage wave below the zero axis so that the portions between the vertical firing peaks are always maintained negative as illustrated by the curve 34 in Fig. 10. This is the voltage which is supplied between the cathode and the control electrode of the thyratron 1.

Shifting the phase relationship of the firing peaks relative to the anode voltage is accomplished by varying the position of the slider 26a of rheostat 26 which varies the current flowing in the saturation control winding 16d. This phase-shifting of the firing peaks is illustrated in Fig. 11 by the curves 35, 36, 37, 38, 39 and 40 of which ordinates represent voltages, and abscissae represent degrees retardation of the firing angle.

As shown in Fig. 11, 1 milliampere direct current flowing in saturating winding 16d results in applying between the cathode and control electrode a vertically peaked firing voltage which is represented by the curve 35. It will be noted that the vertical wave front of this voltage wave lags the supply voltage at the supply terminals 9—13a by 180 degrees, and, owing to the fixed phase-shift produced by the resistor capacitor combination 13, 14 and 15, it lags the line voltage at terminals 9 and 10 and consequently the anode voltage of the thyratron 1 by an additional 20 degrees. The reason for this additional 20 degree lag is to provide a firing peak when the anode voltage of the thyratron is approaching zero going negative and the firing angle is in the region of 180 degrees retard.

An increase in the direct current in the saturating winding to 3 milliamperes produces a phase advance of the vertical firing peak. The phase shifted firing voltage for this degree of saturation is represented by curve 36. For further increases in the direct current flowing in the saturating winding to 6 milliamperes, 8 milliamperes, 10 milliamperes and 13 milliamperes the firing peaks are correspondingly advanced in phase as represented by curves 37, 38, 39 and 40. Since the phase-shift network of this invention is capable of shifting the vertical front of the firing peak through a range of more than 180 degrees, the firing angle can be varied from 180 degrees where the thyratron is full off to zero degrees where it is full on.

A voltage with a vertical wave front has numerous advantages in the firing of thyratrons since it maintains the firing angle constant regardless of any change in the characteristic of the thyratron itself such as results from changes in operating temperature and age. A thyratron requires increasing amounts of hold off bias as the temperature increases, and an old thyratron requires more hold off bias than a new one. In both cases, a firing peak with a vertical firing front will fire an old thyratron or a new thyratron, a cold thyratron or a hot thyratron at the same angle. For this reason, the current balance between thyratrons remains the same in all connections and combinations in which a new thyratron is used with an old thyratron.

A firing voltage with a vertical wave front has a further advantage in the control of thyratrons at the point in the operation in which the load current changes from a discontinuous to a continuous current or vice versa. For example, in a bi-phase rectifier the voltage across the anode and cathode of a thyratron is equal to the voltage from the center tap to the outside tap of the transformer when neither thyratron is conducting. However, if either thyratron is conducting, the voltage across the other is equal to the total transformer voltage i.e. the voltage from one outside tap to the other. If the thyratrons commutate from the conducting thyratron to the non-conducting thyratron, the incoming thyratron has a different characteristic from the one it would have if conduction in the first became extinguished before it became established in the second. Irrespective of the difference in thyratron characteristics under the conditions of continuous and discontinuous current operation, the instant of firing remains unaffected if the control electrode firing voltage has a vertical firing peak.

A similar change in characteristic of the thyratron occurs in a three-phase Y-connected rectifier in which case the voltage across the thyratron changes from the Y voltage to the delta voltage. Here again the control electrode voltage peak with a vertical front does not change the firing point when the current changes from the discontinuous to the continuous mode of operation.

In the modification illustrated in Fig. 2, the direct negative bias voltage is replaced by an alternating voltage bias superimposed on a direct voltage bias which is produced by grid rectification during an interval in which the anode voltage of the thyratron is negative. The alternating voltage bias is produced by connecting in the cathode to control electrode connection of the thyratrons 1 and 2 the secondary windings 41b and 41c of a transformer 41 of which the primary winding 41a is supplied from a suitable source of alternating voltage which may be and preferably is the same source as that from the alternating voltages supplied to the control electrodes of both thyratrons are 180 degrees out-of-phase with their anode voltages. A parallel combination of resistor 42 and capacitor 43 connected in the common cathode circuit of both thyratrons provides the component of direct negative bias voltages upon which the alternating voltage bias is superimposed. The firing voltage produced by the modification of Fig. 2 is represented by the curve 44 in Fig. 12.

Although in accordance with the provisions of the patent statutes this invention is described as embodied in concrete form and the principle thereof has been explained together with the best mode in which it is now contemplated applying that principle, it will be understood that the apparatus shown and described is merely illustrative and that the invention is not limited thereto since alterations and modifications will readily suggest themselves to persons skilled in the art without departing from the true spirit of this invention or from the scope of the annexed claims.

What I claim as new and desire to secure by Letters Patent of the United States is:

1. A phase-shifting network comprising a pair of alternating voltage supply terminals, first and second impedance devices, and a saturable reactor having a first circuit comprising a first load circuit-reactance winding connected in series with said first impedance device supplied from said terminals and having a second circuit comprising a second load circuit-reactance winding oppositely poled with respect to the voltage across said first impedance device and connected in series with said second impedance device connected to be supplied from said first circuit.

2. A phase-shifting network comprising a pair of alternating voltage supply terminals, a first circuit connected to be supplied from said terminals and including a first impedance device, a second circuit connected to be supplied with a voltage derived from said first circuit and including a second impedance device, a saturable reactor having a first load circuit-reactance winding connected in said first circuit, and a second load circuit-reactance winding in said second circuit poled to oppose said derived voltage for counteracting therein the effect produced by the load current of said reactor prior to the point of saturation in each cycle of the alternating voltage supply, a pair of output terminals, connections for deriving from said second circuit and supplying to said output terminals a periodically varying voltage, and means for varying the point of saturation of said reactor in each cycle of the alternating voltage supply to vary the phase relationship between said periodically varying voltage and said alternating voltage.

3. A phase-shifting network comprising a pair of alternating voltage supply terminals, a first circuit connected to be supplied from said terminals, a first impedance device included in said circuit, a second circuit connected to be supplied with a voltage derived from said first circuit, a second impedance device comprising a resistor-capacitor combination connected in said second circuit, a saturable reactor having a first load circuit reactance connected in said first circuit and having a second load circuit-reactance winding connected in said second circuit for counteracting the voltage produced therein by the load current of said reactor prior to the point of saturation in each cycle of the alternating voltage supply, connections for deriving from said second circuit and supplying to said output terminals a periodically varying voltage, and means for varying the point of saturation of said reactor in each cycle of the alternating voltage supply to vary the phase relationship between said alternating voltage and said periodically varying voltage.

4. A phase-shifting network comprising a pair of alternating voltage supply terminals, a first circuit including a first impedance device connected to be supplied from said terminals, a second circuit including a second impedance device connected to be supplied with a voltage derived from said first impedance device, a saturable reactor having a first load circuit-reactance winding connected in series relationship with said first impedance device and having a second load circuit-reactance winding connected in series relationship with said second impedance device and poled to oppose the voltage across said first impedance device thereby to counteract the voltage produced in said second circuit by the load current of said reactor prior to the point of saturation in each cycle of the alternating voltage supply, a pair of output terminals, connections for deriving from said second circuit and supplying to said output terminals a periodically varying voltage, and means for varying the point of saturation of said reactor in the cycle of the alternating voltage supply to vary the phase relationship between said alternating voltage and said predetermined voltage.

5. A control system comprising in combination a pair of alternating voltage supply terminals, an electric valve connected to be supplied from said terminals having an anode, a cathode and a control electrode, a phase-shifting network comprising a circuit connected to be supplied from said terminals, connections for deriving from said circuit and supplying to said cathode and control electrode a periodically varying voltage, a saturable reactor having a first load circuit-reactance winding connected in said circuit and having a second load circuit-reactance winding included in said connections and poled to counteract the voltage produced therein by the load current of said reactor prior to the point of saturation in said reactor in each cycle of the alternating voltage supply, means for varying the point of saturation of said reactor in the alternating voltage cycle to vary the phase relationship between said alternating voltage and said periodically varying voltage, and means for supplying in said connections an alternating bias voltage displaced 180 degrees in phase from the voltage supplied to said anode.

6. A control system comprising in combination a pair of alternating voltage supply terminals, an electric valve connected to be supplied from said terminals having an anode, a cathode and a control electrode, a phase-shifting network comprising a circuit connected to be supplied from said terminals, connections for deriving from said circuit and supplying to said cathode and control electrode a periodically varying voltage, a saturable reactor having a first load circuit-reactance winding connected in said circuit and having a second load circuit-reactance winding included in said connections and poled to counteract the voltage produced therein by the load current of said reactor prior to the point of saturation in said reactor in each cycle of the alternating voltage supply, means for varying the point of saturation of said reactor in the alternating voltage cycle to vary the phase relationship between said alternating voltage and said periodically varying voltage, and means for supplying in said connections a direct bias voltage negative toward said control electrode, comprising a parallel resistor capacitor combination connected in said connections between said cathode and said control electrode.

7. A control system comprising in combination a pair of alternating voltage supply terminals, a biphase rectifier supplied from said terminals comprising a pair of electric valves each having an anode, a cathode and a control electrode, a pair of phase-shifting networks, one for each of said valves, and each comprising a circuit connected to be supplied from said terminals, connections for deriving from said circuit and supplying between the cathode and control electrode of the corresponding valve a periodically varying voltage, a saturable reactor having a first load circuit-reactance winding connected in said circuit and having a second load circuit-reactance winding included in said connections and poled to counteract the voltage produced therein by the load current of said reactor prior to the point of saturation in each cycle of the alternating voltage supply, means for varying the point of saturation of said reactor in each cycle of the alternating voltage supply, and means for supplying in said connections a bias alternating voltage displaced 180 degrees from the anode voltage of the corresponding valve, and means for simultaneously varying the point of saturation in the alternating voltage cycle of the reactors of both said networks thereby to vary the phase relationship of said periodically varying voltage with respect to the anode voltages of said valves.

8. A control system comprising in combination a first pair of alternating voltage supply terminals, an electric valve having an anode and a cathode connected to be supplied from said terminals and provided with a control electrode, a second pair of alternating voltage supply terminals, a phase-shift circuit supplied from said first supply terminals and connected to said second supply terminals for supplying thereto a voltage dephased with respect to the voltage of said first pair of supply terminals, a phase-shifting network comprising said second supply terminals, a circuit connected to be supplied from said second supply terminals, connections for deriving from said circuit and supplying to said cathode and control electrode a periodically varying voltage, and a saturable reactor having a first load circuit-reactance winding connected in said circuit and having a second load circuit-reactance winding included in said connections and poled to counteract the voltage produced therein by the load current of said reactor prior to the point of saturation of said reactor in each cycle, and means for varying said point of saturation in the cycle of the alternating voltage supply to vary the phase relationship between the alternating voltage supplied to said anode and the periodically varying voltage supplied to said control electrode.

References Cited in the file of this patent

UNITED STATES PATENTS

| | | |
|---|---|---|
| 2,597,730 | Hornfeck | May 20, 1952 |
| 2,714,188 | Scherer | July 26, 1955 |
| 2,737,626 | Boast et al. | Mar. 6, 1956 |